March 14, 1939.  F. P. RODWICK  2,150,247
WAFFLE IRON HANDLE
Filed Oct. 11, 1937
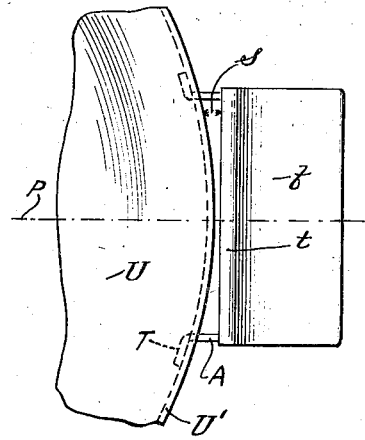
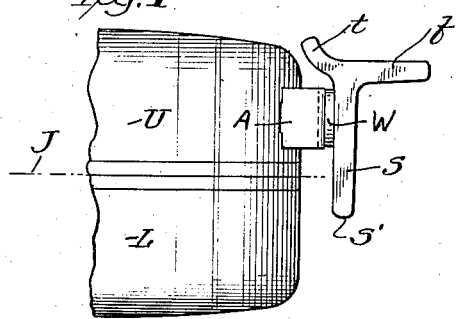
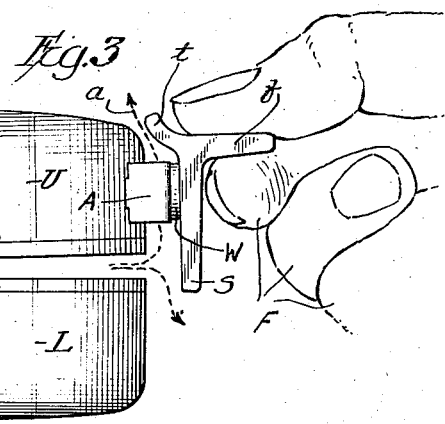
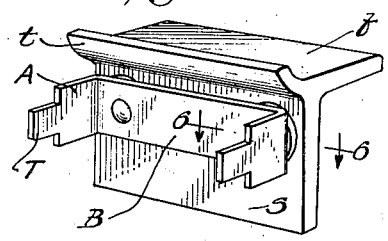
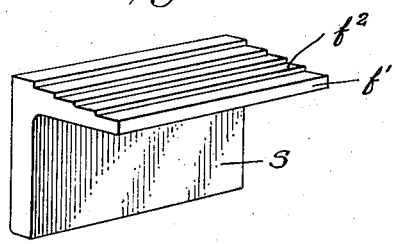
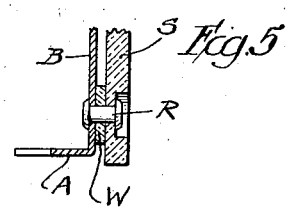
Inventor:
Frank P. Rodwick
By Albert Scheibl
Atty.

Patented Mar. 14, 1939

2,150,247

UNITED STATES PATENT OFFICE 2,150,247

WAFFLE IRON HANDLE

Frank P. Rodwick, Chicago, Ill., assignor to Chicago Electric Manufacturing Company, Chicago, Ill., a corporation of Illinois Application October 11, 1937, Serial No. 168,373

7 Claims. (Cl. 53—10)

My invention relates to the class of handles used for raising an upper section of an electric waffle iron or the like, and for returning such a raised section to its normal position, its general object being that of shielding a handle-grasping hand against the deleterious effect of vapor emitted during the moving of such an appliance section.

A modern household type of electric waffle iron usually comprises two superposed casing sections, each of which includes a grid and a heating unit associated with that grid. These sections are hinged to each other at one side of the waffle iron, so that the upper section can readily be raised for pouring batter over the lower grid, for examining the extent to which the waffle has baked, and for removing the waffle when baked.

To permit the needed raising and subsequent lowering of the upper section, this section usually has a handle of non-heat-conducting material fastened to it at the opposite side of the upper section from the hinge. Moreover, the two superposed and relatively spaced grids usually are so shaped that the radially outer portions of their opposed faces seat on each other before the baking begins, thereby confining the heating effect of the grids largely to the batter interposed between these grids.

Owing to the resulting substantial seal between the radially outer portions of the two grids, the evaporation of moisture from the batter during the baking produces a considerable vapor pressure within the waffle iron, so that hot vapor will issue from the interior of the iron as soon as the user begins to raise the upper section. Consequently, if the lifting handle projects laterally from the side of the upper section which is opposite the hinge side, namely the side of the waffle iron where the gap between the two grids is greatest during the initial raising of the upper section, the hot blast of outrushing vapor impinges on fingers of the hand which is lifting the handle.

This unpleasant effect on the hand of the user has become all the more annoying in recent years, both because of the relatively short and usually horizontally flat handles now in common use, and because the low height of the upper section of a modern waffle iron has made it necessary to dispose such a laterally projecting handle rather close to the level of the juncture between the portions of the two grids which seat on each other before the baking is begun.

Moreover, the use of relatively short and horizontally substantially flat handles has introduced the added objection that, unless the user is extremely careful, the thumb of the handle-grasping hand (which thumb most conveniently presses downward on the handle) may contact with the metal of the also considerably heated upper casing half. Both of the above recited objections are also encountered by the users of other electric cooking or baking appliances in which either a hinged upper section or a hinged cover has a handle projecting from such an upper section or cover at the side opposite the hinge, as for example with electric sandwich toasters of the now commercial types.

My present invention aims to overcome these objections in a highly simply and inexpensive manner, so as to insure comfort for the handle-grasping hand of the user. Generally speaking, I accomplish the securing of this comfort by three departures from the heretofore customary constructions of the above mentioned type of handle, which departures desirably are employed conjointly, namely:

(1) Providing a shield depending from, and desirably integral with, the handle, which shield will prevent a direct flow of issuing hot vapor toward the part of the user's hand which is below the handle during the initial raising of the upper section of the waffle iron.

(2) Spacing this shield, as well as the major portion of the handle, outwardly from the adjacent side of the casing to which the handle is fastened, so that vapor projected against and deflected upwardly by the inward face of the shield will pass upwards close to that side of the casing.

(3) Providing the handle with a portion projecting upwardly, beyond the digitally grasped part of the handle, from the edge of that part which is nearest to the adjacent side of the casing, so that this upwardly projecting part will serve as a stop for preventing a finger resting on the top of the digitally grasped handle part from engaging the upper casing section (or cover) which supports the handle.

(4) Having the inward face of the just named upwardly projecting handle portion slope upwardly toward the said upper casing section or cover, whereby vapor passing upwardly between the shield portion or element of the handle will be deflected over that said casing section or cover and away from a finger resting on the digitally grasped part of the handle.

Illustrative of the difficulty overcome by my invention and of embodiments of my invention, Fig. 1 is a side elevation of the portions of two superposed waffle iron sections which are diametrically opposite the hinge connecting these sections, showing these as they appear when the iron is closed, and with the upper section supporting a handle embodying my invention.

Fig. 2 is a plan view of the parts shown in Fig. 1, with dotted lines showing how the stirrup of the handle is fastened to the adjacent side of the upper casing section.

Fig. 3 is an elevation allied to Fig. 1, showing the upper section as slightly raised, and also including part of a hand which has effected this raising, with dotted lines showing directions in which hot vapor is deflected by portions of a handle embodying my invention.

Fig. 4 is a perspective view of the handle and handle-support assemblage of Figs. 1 to 3 before the same was attached to the upper casing section.

Fig. 5 is a fragmentary and somewhat enlarged section taken along the line 5—5 of Fig. 4.

Fig. 6 is a perspective view of another embodiment of my invention which does not include the upper air-deflecting portion of the handle shown in Figs. 1 to 4.

To overcome the heretofore recited objections I employ a handle including both a horizontally flattened finger-piece $f$ and a shield S depending from the inward edge of the said finger-piece sufficiently to present the lower edge $S^1$ of the shield at an elevation considerably below the level J of the juncture of the grids of the two casing sections when the waffle iron is closed, as shown in Figs. 1 and 2. I also desirably form and support the handle so that the shield S will extend between the waffle iron and more than one of the lower fingers of the finger-piece grasping hand, as shown in Fig. 3.

With such an angle-sectioned finger-piece and shield assembly, the shield is effectively interposed between the said lower fingers and the waffle iron during the initial raising movement of the upper waffle iron section—namely, during the time when hot vapor is forcibly emitted under its accumulated pressure. Consequently, such issuing vapor is deflected by the shield S, and when this shield has the major portion of its inward face freely separated (by a space such as $s$ in Fig. 2) from the adjacent side of the upper casing section, the vapor which otherwise would impact against the said lower fingers is deflected partly upwards and partly downward along the said casing section side.

To increase the shielding of the hand of the user still further, I preferably also provide my handle with an upwardly extending thumb-stop portion $t$ to prevent the thumb of the user from being inadvertently slid against the hot metal of the shell of the upper casing section. In addition, I preferably form the thumb-stop portion $t$ so that it will slope upwards toward the waffle iron, so that the inward face of this sloping portion $t$ will deflect the upwardly directed portion of the emitted vapor away from the user's thumb, as indicated by the arrow line $a$ of Fig. 3.

When my hand-shielding handle is of the uniform section shown in Fig. 4, which allows it to be made cheaply of wood or the like, both the attaching of this handle to the upper waffle iron section and the spacing of the shield portion of the handle from the adjacent side of that section can readily be effected after the manner shown in Figs. 3, 4 and 5.

These figures show the use of a handle-supporting and shield-spacing metal stirrup comprising a back B fastened to horizontally spaced portions of the shield part S of the handle by rivets R. This stirrup has the free end portions of its arms A reduced in width to afford tabs T which are clinched through slots in the upright wide $U^1$ of the shell of the upper casing section U, as shown in dotted lines in Fig. 2. Moreover a washer W of asbestos is desirably slid over each rivet between the stirrup back B and the shield (as in Fig. 5) before the rivet is clinched to the said stirrup, so that these washers will reduce the conduction of heat from the waffle iron to the handle.

In practice, the shield desirably has flat inward outward faces, so that the said space $s$ between the inner face of the shield and the usually cylindrical side of the upper section or cover of such a baking appliance increases in both horizontal directions from a vertical plane P (Fig. 2) transverse of the midlength of the handle, thereby permitting vapor between the shield and the waffle iron to spread horizontally also along the inner face of the shield.

To make my improved handle highly effective, I also preferably employ the following proportions and relations of parts: First, I make the depending shield part S of the handle of at least as great a width as the finger-piece $f$; namely a width several times that of a woman's finger, as can be judged from a comparison of Figs. 3 and 4. Second, I dispose the shield nearer to the waffle iron section which supports it than to the outer end of the finger-piece. And third, I have the finger-piece project outwardly beyond the shield by a distance at least substantially equal to the width of a finger. And fifth, I connect my improved handle to the upper waffle iron section by a supporting member (such as the stirrup shown in Fig. 4) which will only slightly obstruct the upward flow of hot air and vapor between the shield portion of my handle and the said waffle iron section.

Moreover, I preferably dispose this supporting member at an elevation lower than the finger-piece $f$, and have the shield S extending to a considerably lower elevation than the bottom of the supporting member. By doing this, which I readily accomplish by fastening the supporting member to the upper portion of the shield, instead of disposing the said member in alinement with the finger-piece, I cause this shield to deflect hot vapors below even a plurality of fingers of the hand grasping the finger-piece, as shown by the lower arrow line in Fig. 3.

However, it should be understood without further illustration or description that the means for supporting my here disclosed handle can be varied without departing from the spirit of my invention. So also, the providing of both a shield and a thumb-stop formed integral with the finger-piece is not essential to my invention. For example, Fig. 6 shows a handle comprising merely a shield element S in addition to a finger-piece $f^1$ the upper face of the latter being provided with steps $f^2$ ascending away from the free edge of the finger-piece in substitution for the thumb-stop $t$ of my previously described embodiment.

I claim as my invention:

1. A handle for a baking appliance which has two superposed sections connected by a hinge at one side of the appliance, and in which the handle is supported by and projects laterally outwardly from the opposite side of the upper section; the handle comprising a finger-piece disposed at a higher elevation than the lower edge of the upper section and projecting laterally away from the said opposite side of the upper section of the appliance, and an imperforate shield depending from the inward part of the finger-piece and presenting its lower end at an elevation considerably lower than the said lower edge of the upper section when the two sections are superposed, the shield being generally freely spaced from both of the said sections.

2. Means for affording a digital raising of the upper section of a baking appliance of the recited class, comprising a handle as per claim 1, and a supporting member interposed between and fastened to the shield of the handle.

3. Means for affording a digital raising of the upper section of a baking appliance of the recited class, comprising a handle as per claim 1, a supporting member interposed between and fastened to the shield of the handle, the said supporting member being at lower elevation than the finger-piece of the handle.

4. A baking appliance handle as per claim 1, including a thumb-stop projecting upwardly from the inward part of the handle and freely spaced from the section or cover by which the handle is supported.

5. A baking appliance handle as per claim 1, including a thumb-stop projecting upwardly from the inward part of the handle and toward the axis of the said upper section, and freely spaced from that section from the said upper section, the thumb-stop presenting its inward face in a surface into which the inward face of the shield merges.

6. A baking appliance handle as per claim 1, including a thumb-stop projecting upwardly from the inward part of the handle and freely spaced from the said upper section, the thumb-stop sloping upwards towards the section or cover by which the handle is supported.

7. A handle as per claim 1 for an upper baking appliance section which has a cylindrical riser side, in which handle the inward face of the shield is a flat and substantially upright surface extending at right angles to a plane diametric of the upper section and extending through the midlength of the handle.

FRANK P. RODWICK.